(12) United States Patent
Sareen et al.

(10) Patent No.: US 9,582,541 B2
(45) Date of Patent: Feb. 28, 2017

(54) SYSTEMS, METHODS, AND COMPUTER PROGRAM PRODUCTS TO INGEST, PROCESS, AND OUTPUT LARGE DATA

(71) Applicant: NetApp, Inc., Sunnyvale, CA (US)

(72) Inventors: Apoorva Sareen, Bangalore (IN); Rajesh Shriyan, Apex, NC (US); Vikram Kumar Singh, Bangalore (IN); Jordan Patrick Hambleton, San Jose, CA (US); Senthil Kumar Laguduwa Sankaran, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 386 days.

(21) Appl. No.: 14/137,707

(22) Filed: Dec. 20, 2013

(65) Prior Publication Data

US 2014/0222843 A1 Aug. 7, 2014

(30) Foreign Application Priority Data

Feb. 1, 2013 (IN) .............................. 292/DEL/2013

(51) Int. Cl.
*G06F 17/30* (2006.01)
*H04L 29/08* (2006.01)
(52) U.S. Cl.
CPC .... *G06F 17/30507* (2013.01); *H04L 67/1097* (2013.01)
(58) Field of Classification Search
CPC ..................... G06F 17/30507; G06F 17/30386

USPC .......................................................... 707/755
See application file for complete search history.

(56) References Cited

U.S. PATENT DOCUMENTS

| | | | |
|---|---|---|---|
| 6,556,950 B1* | 4/2003 | Schwenke | G05B 17/02 700/83 |
| 6,574,672 B1* | 6/2003 | Mitchell | G06F 1/163 709/200 |
| 8,972,465 B1* | 3/2015 | Faibish | 707/822 |
| 9,092,802 B1* | 7/2015 | Akella | G06Q 30/0256 |
| 2004/0073404 A1* | 4/2004 | Brooks | G05B 19/409 702/183 |
| 2007/0078898 A1* | 4/2007 | Hayashi | G06F 17/30038 |
| 2007/0245238 A1* | 10/2007 | Fugitt | G06F 3/0481 715/700 |
| 2012/0131002 A1* | 5/2012 | Rakshit | H04L 67/10 707/736 |

OTHER PUBLICATIONS

Mansuri et al., Integrating unstructured data into relational databases, 2006, 12 pages.*

* cited by examiner

*Primary Examiner* — Noosha Arjomandi

(57) ABSTRACT

A method for ingesting data, the method comprising receiving a file including a plurality of portions, each of the portions corresponding to a respective characteristic of a hardware or software component in a deployed system; breaking the file into a plurality of sections, each of the sections corresponding to a respective portion of the file; for each section, adding first metadata to uniquely identify the file and provide a name for the section; and distributing the sections to a plurality of container files.

18 Claims, 3 Drawing Sheets

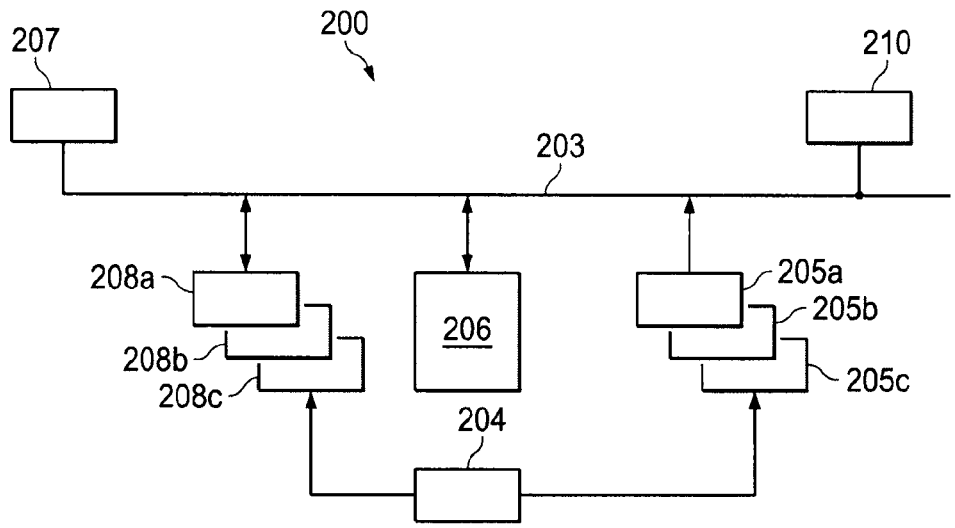
Fig. 2
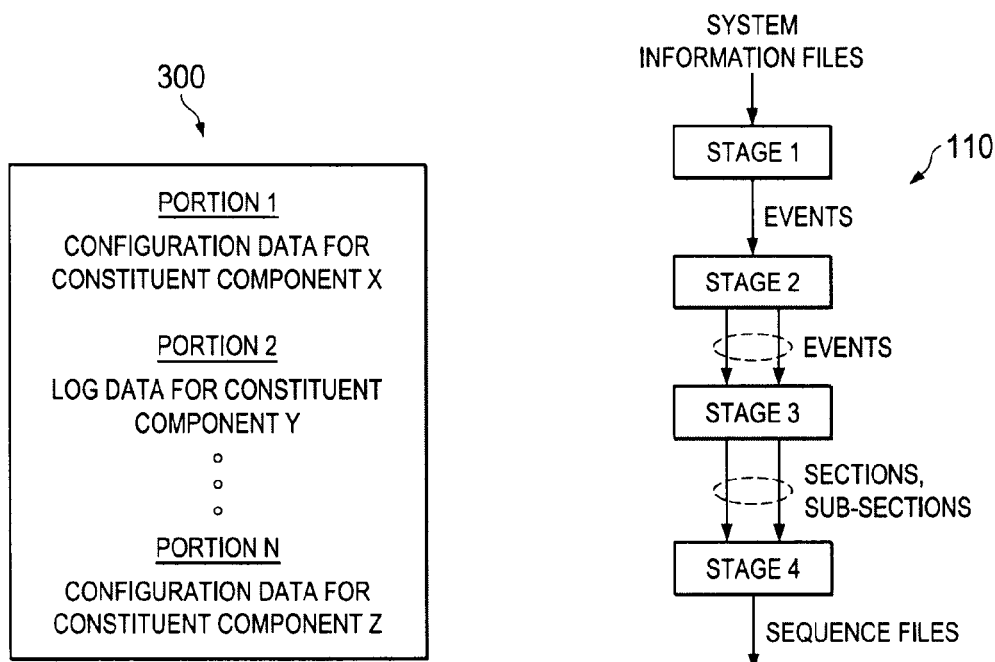
Fig. 3
Fig. 4

SYSTEMS, METHODS, AND COMPUTER PROGRAM PRODUCTS TO INGEST, PROCESS, AND OUTPUT LARGE DATA

PRIORITY

The Present application claims priority to Indian Patent Application No. 292/DEL/2013, entitled "Systems, Methods, and Computer Program Products to Ingest, Process, and Output Large Data," filed on Feb. 1, 2013, the entirety of this disclosure is hereby incorporated by reference.

TECHNICAL FIELD

The present description relates to distributed analytic computing systems and, more specifically, to ingestion, processing, and outputting of large data in such computing systems.

BACKGROUND

Various systems exist to perform analysis on very large data sets (e.g., petabytes of data). One such example is a Map Reduce distributed computing system for large analytic jobs. In such a system, a master node manages the storage of data blocks in one or more data nodes. The master node and data nodes may include server computers with local storage. When the master node receives a processing task, the master node partitions that task into smaller jobs, where the jobs are assigned to the different subordinate (data) nodes. This is the mapping part of Map Reduce, where the master node maps processing jobs to the subordinate nodes.

The subordinate nodes perform their assigned processing jobs and return their respective output to the master node. The master node then processes the different output to provide a result for the original processing task. This is the reducing part of Map Reduce, where the master node reduces the output from multiple subordinate nodes into a result. Map Reduce is often used by search engines to parse through large amounts of data and return search results to a user quickly and efficiently. One example of a Map Reduce system is the Hadoop™ framework from Apache Software Foundation, which uses the Hadoop™ Distributed File System (HDFS).

An example of a system that processes very large data sets is a data-collecting customer support system. For instance, AutoSupport™ ("ASUP") is the "call home" technology available to NetApp customers that subscribe to NetApp's AutoSupport™ service and enables NetApp products to automatically send configuration, log, and performance data through SMTP, HTTP or HTTPS protocols to NetApp data centers. NetApp uses the ASUP data reactively to speed the diagnosis and resolution of customer issues and proactively to detect and avoid potential issues. Such customer support system a Network File System (NFS) source, a Relational Database Management System (RDBMS) target, and decoupled Java and perl processes to process the data. However, the conventional implementation using NFS, RDBMS, and Java and perl is not easily scalable to support future products or to accommodate increasing data load.

For instance, there is a challenge to support enhanced object models which get released with newer operating system versions along with supporting the older versions. For a very large relational database (e.g., hundreds of billions records) it is not trivial to add/update/remove relational constraints with releases of new features to be supported.

BRIEF DESCRIPTION OF THE DRAWINGS

The present disclosure is best understood from the following detailed description when read with the accompanying figures.

FIG. 2 is an illustration of an example hardware architecture upon which the architecture of FIG. 1 may be implemented, according to one embodiment.

FIG. 3 is an illustration of an example system information file, as it may be received over a network from a component at the ingestion section, adapted according to one embodiment.

FIG. 4 is an illustration of an example data ingestion stage, adapted according to one embodiment.

DETAILED DESCRIPTION

Figure 1:
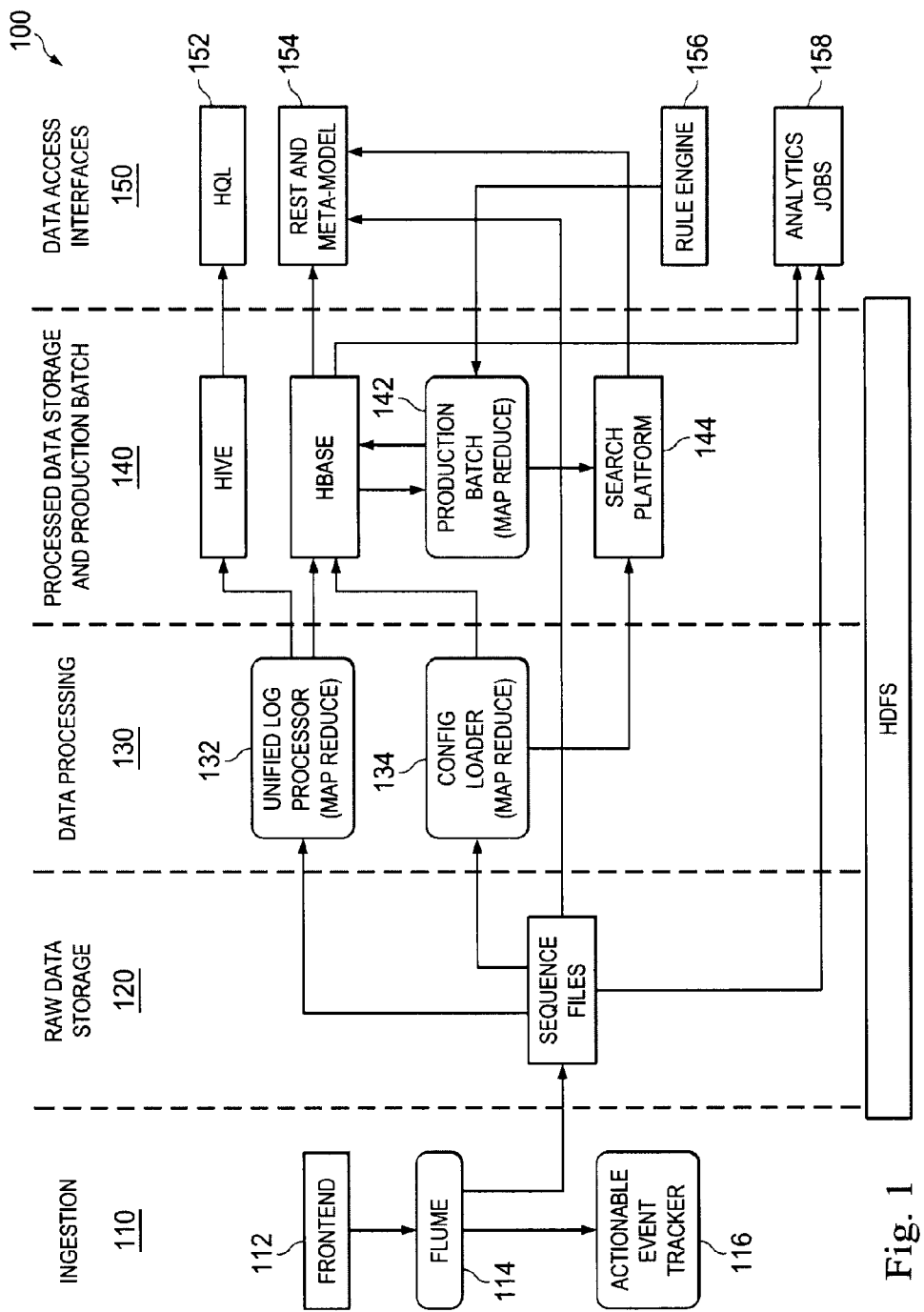
FIG. 1 is an illustration of an example architecture, adapted according to one embodiment.

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer program products that handle large data. In one example, an architecture is disclosed that handles the data from ingestion, processes and stores the data, and provides for data output for analysis by a user. Although the scope of embodiments is not limited to any particular use case, one example includes a backend architecture for a service that receives voluminous information over the Internet from deployed systems all over the world to provide customer support for those systems.

FIG. 1 is an illustration of exemplary architecture 100, adapted according to one embodiment. Architecture 100 is divided into several conceptual sections for ease of explanation. Section 110 is the ingestion section, in which raw data from the Internet is received and pre-processed. Pre-processing may include, e.g., determining whether a received piece of data is just data in the ordinary course of business or whether it is associated with an event that requires action from a service provider. Additionally, pre-processing may also include manipulating the data to prepare the data for storage by, for example, breaking large data into smaller data.

Section 120 is referred to as the raw data storage section. Section 120 includes processing to further manipulate the data by reformatting the data into files that are suitable for storage in the Map Reduce storage system. In the present example, the Map Reduce storage system includes HDFS, and the particular files used include sequence files. As explained in more detail below, when the received data includes logical sections, each of the sections corresponding to a characteristic of hardware or software component, the sections may be distributed among a set of sequence files so that each sequence file includes multiple sections from a variety of different systems.

Section 130 includes the data processing section. Section 130 includes functionality to perform map operations and reduce operations on the data in the sequence files. In an example in which the data includes log information and configuration information for hardware and software, section 130 can process log information and configuration information separately. Continuing with the example, one embodiment parses the log information and stores the parsed log information in a data warehouse, such as a HIVE database; similarly, the embodiment parses the configuration information and stores the parsed configuration information in a different database, such as an HBASE database. Section 140 includes databases for the log information and the configuration information.

Section 150 includes the data access interfaces. For instance, section 150 includes a repository for metadata to allow for more sophisticated indexing of the HBASE configuration data, where an example of such indexing includes searching for all systems belonging to a particular user. Other features include query logic to search for information in the HIVE database and analytics logic to analyze the data that is retrieved from the databases. A support technician can use the interfaces of section 150 to search for data, view the data, and analyze the data.

While the examples herein refer to specific technologies, such as HDFS, HIVE, and HBASE, the scope of embodiments includes other appropriate technologies. For instance, any Map Reduce system with a file system now know or later developed may be adapted for use in various embodiments. Other file systems that can be used with Map Reduce include, but are not limited to, GLUSTERFS, available from Red Hat, Inc., BIG TABLE, available from Google, and the like.

Similarly, the scope of embodiment is not limited to the use of HBASE, as other columnar data storage tools may be used. Examples include, but are not limited to, CASSANDRA, available from Apache Software Foundation, and MONGODB, available from 10gen. Furthermore, various embodiments may use technologies other than HIVE to offer high-level scripting capabilities. Examples include providing a programming, searching, and indexing infrastructure using PIG from Apache Software Foundation.

Architecture 100 shows a conceptual rendering of the system. An example hardware configuration upon which architecture 100 may be implemented is shown in FIG. 2. The distributed analytic computing system includes master node 206 and data nodes 205a-c. In this example, the master node 206 and the data nodes 205a-c are configured to act as a Map Reduce system. Network computer 210 is attached to network 203 and can be used as a node for a human user to perform further analysis and queries on the processed data.

Each of the data nodes 205a-c may include, for example, a personal computer (PC), server computer, a workstation, handheld computing/communication device or tablet, and/or the like. The same is true for master node 206 and network computer 210 as well, though in many embodiments each of master node 206 and data nodes 205a-c includes a server computer, such as a commodity server with many processors running the Linux operating system. FIG. 2 shows three data nodes 205a-c, but the scope of embodiments can include any appropriate number of data nodes.

Master node 206, data nodes 205a-c, network computer 210, and storage system 204 are in communication over network 203 using switch 207. The network 203 may include, for example, a local area network (LAN), wide area network (WAN), the Internet, or any combination of such interconnects. Storage system 204 is coupled to ingest servers 208a-c through a Serial Attached SCSI (SAS) physical connection and protocol, or similar physical connection and protocol, though the scope of embodiments may include any appropriate interface to storage system 204. Ingest servers 208a-c provide appropriate pre-processing to received data and pass the received data to storage system 204, where the data is stored as sequence files or as other files adaptable to Map Reduce.

Storage system 204 is not limited to any particular storage technology and can use any storage technology now known or later developed. For example, storage system 204 has a number of nonvolatile mass storage devices (not shown), which may include conventional magnetic or optical disks or tape drives; non-volatile solid-state memory, such as flash memory; or any combination thereof. In one particular example, storage system 204 may include one or more Redundant Arrays of Independent Disks (RAID)s.

As mentioned above, ingest servers 208a-c perform pre-processing and storage. Ingest servers 208 may be implemented in sections 110 and 120 (FIG. 1) to store the data as sequence files or other files in storage system 204. Data processing section 130 (FIG. 1) may be implemented using master node 206 and data nodes 205a-c. The processed data storage of section 140 may be implemented by storing the processed data back into storage system 204 or into another storage system (not shown). Data access interface section 150 (FIG. 1) may be implemented using logic at master node 206 and/or logic at network computer 210.

Returning to FIG. 1, the various sections of architecture 100 are described in more detail below. A noted aspect of the example of architecture 100 is that the source of data is HDFS, the target is HBASE, and the processing application is Map Reduce. All three of features are scalable technologies which have been proven to scale up to thousands of nodes. Thus, as the amount of data to be ingested, processed, and analyzed increases, the nodes of the system can be scaled out to meet the demands.

Moving to data ingestion stage 110, there are three portions—frontend 112, flume 114, and actionable event tracker 116. An example implementation of ingestion stage 110 is shown in more detail in FIG. 4 (described below). System information is sent to architecture 100 via any appropriate transport protocol, such as SMTP, HTTP, and the like. The system information that comes into frontend 112 is received as files, where each file has multiple sections corresponding to respective characteristics of hardware and software components of a deployed system. In one example the deployed systems include network storage systems. One example of a simple network storage system is a first RAID and a second RAID with a common controller forming a cluster. In such an instance, the network storage system may send system information periodically or at certain events to the architecture 100 as a part of a "call home" customer support feature. In such an embodiment, each file may have multiple portions that each correspond to a different characteristic of the hardware or software of the cluster. For instance, each file may have multiple portions to describe disk configurations for each RAID, portions for log information for each disk, portions for log and configuration information for the controller, a portion describing the hardware configuration of a motherboard of the controller, etc. In fact, clusters are complex entities made of many constituent systems, where each constituent system may be described by multiple sections in order to convey configuration and log information.

FIG. 3 is an illustration of an example system information file 300, as it may be received over a network from a component at ingestion section 110, adapted according to one embodiment. File 300 has portions 1 to N, each portion corresponding to log or configuration data of a component of a deployed system. Generally, configuration data describes the hardware/software characteristics of a component and information regarding how that component is coupled to other components of the system. Generally, log data includes information about the various operations performed by the component. The log data is usually much more voluminous than is the configuration data.

It should be noted that files may be received for any reason. Two reasons in particular include periodic reporting of operation and real-time (or near-real-time) error reporting. For instance, a deployed system may be programmed to report back to architecture 100 every week, whether or not there is an error. The deployed system may also be programmed to report back to architecture 100 whenever there is an error in the system. Engineers and customer support professional can use the information sent by the deployed systems to learn about problem areas in general and also to diagnose and address specific customer errors.

It should also be noted that the examples given herein are with respect to network storage systems, but the scope of embodiments is not so limited. Any deployed system that can report system information to a remote architecture may be adapted for use.

FIG. 4 is an illustration of data ingestion stage 110 adapted according to one embodiment. Stage 1 generally corresponds to frontend 112 of FIG. 1. Stage 1 in this example includes a directory watcher client, which listens on a directory for incoming system information and generates events, where one event per received information file is generated. An event may include an Network File System (NFS) mount of an incoming system information file. Stages 2 and 3 correspond to flume 114.

Stage 2 includes a header parser, which on retrieval of an incoming system information event, processes the header in the event to determine whether the event is actionable or non-actionable. There is a separate path for processing actionable and non-actionable events downstream.

Actionable and non-actionable events can be filtered using any appropriate technique. The present example includes a rules engine that is programmed to examine a header of an event file and to discern therefrom whether the system information file was sent as a part of a periodic report or whether the system information file was sent in response to a particular error on a deployed system. Thus, in one example, a rules engine may be programmed to classify periodic reports as non-actionable and error reports as actionable.

Of course, a rules engine may be programmed in any appropriate manner, and other examples may include rules regarding header information at a more detailed level of granularity. One example of a rules engine that can be used in various embodiments includes the DROOLS engine, available from Red Hat, Inc.

At stage 3 there is a fork in processing for actionable and non-actionable events. In this example, both paths are parallel and perform similar processing, except where noted below. Stage 3 includes a body parser that parses the body of each event and creates sections that correspond to the portions of the system information file. Stage 3 may process events with any packaging format, such as text based, gzip, 7zip, mime separated mail body, tgz, and the like.

In some instances, stage 3 may include a feature to handle big files. As a generalization, if a particular portion in an event is larger than a threshold, stage 3 may break the portion into multiple sub-sections and add metadata to each of the sub-section to indicate that a sub-section is part of a larger section and to indicate how it fits together with other sub-sections. For instance, when there is a fixed memory pool for storing objects, and when a portion is quite large in size, the portion can be broken down into several smaller sub-sections so that it can be handled without causing memory issues. At a downstream layer (e.g., the data processing layer 130 of FIG. 1) these sub-sections are collected to restore the broken information.

The stage 3 discussion above refers to sections, which correspond to portions in the system information files. Sub-sections in this portion of the discussion include parts of a portion that have been broken into smaller pieces. Depending on the size of a portion, it may or may not be broken into sub-sections. Later, each sub-section may be treated like a whole section for purposes of storing to HDFS.

In one example, a section may range from few kb to hundreds of MB data. Flume 114 (or any java process) can handle data depending upon the Java Virtual Machine (JVM) size. A large section has the potential to use up available process memory, resulting in a hung/dead process and also limit the amount of concurrency which can be achieved in handling multiple data streams. Thus, various embodiments include a configurable big file handling functionality in stage 3 to break up large sections into multiple smaller sub-sections. Each file portion has metadata information associated with it, which describes information about that particular portion. While sectioning data, stage 3 adds metadata to each sub-section to indicate how the sub-sections are related to each other. In some examples, stage 3 adds the following metadata to sub-sections when breaking a section up: a flag "isPartialSection" is set as true; a sequential counter metadata "sectionPartNo" is initialized as 1 and incremented for consecutive sub-sections; and the last partial section has a flag "isLastSectionPart" set as true. This way a large section will be stored as smaller sections where the "sectionPartNo" will have values 1, 2 . . . N where the last Nth section will have the "isLastSectionPart" metadata set as true. The section name would be same for each sub-section that is broken from a given section.

The config loader 134 at data processing section 130 and REST based tool in data access interface section 150 are consumers of the data produced by ingestion section 110. The config loader 134 is responsible for parsing and loading the configuration data sent in the input sections and update the HBASE database. REST interface provides functionality to download these raw section through an end user support tool. When either one of those consumers reads a section from HDFS it may perform the following determinations/processes: if "isPartialSection" value is false, then the section is complete; if "isPartialSection" value is true, then the section is a partial section; aggregate all the sections in the file/storage having the same section name; validate that all sub-sections have been loaded by finding the section having "isLastSectionPart" value true and note its "sectionPartNo" value; if "sectionPartNo" value is N, then the aggregated sections "sectionPartNo" value should be contiguous from 1 to N.

A consumer system can stitch sub-sections in any appropriate manner. In one example, since the data is stored on HDFS, a Map Reduce program can stitch the partial sections using the above algorithm. In another example, sub-sections can be stitched on-demand when they are requested. The config loader tool 134 stores the meta information of each section in the HBASE database, so that when a client requests to download a section through REST interface, architecture 100 first looks in the HBASE table for the meta information of the system and the partial sections sequentially from first to last sub-sections.

Moving to stage 4 of FIG. 3, stage 4 may also be referred to as an HDFS sink. Stage 4 is where the sections and sub-sections are collected and written to HDFS in sequence file format. Each section or sub-section is wrapped in Java Script Object Notation (JSON)-like format which contains the section body (converted into text) and metadata which points to location of that section in the file (e.g., file name and offset). The actionable path also sends a message to the actionable event tracker 116, which is a case creation engine to generate customer support cases.

Further in some embodiments, flume 114 is configured to ensure that an acknowledgment is sent to a previous stage when a section or sub-section is accepted. If a stage does not receive an acknowledgement for a section or sub-section that it has sent, the stage may retry sending the section or sub-section to another, parallel high-availability part of the next stage (if possible). If the parallel parts of the next stage busy (or down), then the feedback trickles back to stage 1. This forms a feedback loop, where the directory watcher at stage 1 can automatically adjust its throttle based on the feedback. Thus, if the feedback indicates a bottleneck downstream, stage 1 may temporarily halt or slow its sending of files until the bottleneck is cleared. Such feature may allow various embodiments to handle bursts of received files with a minimum of errors or outages.

Stage 4 is followed by storage to HDFS. Further in this example, flume 114 writes the raw data files to the HDFS database in sequence file format. A sequence file includes a list of key value pairs (where a key and value both can be binary or text). In this example, the key is a combination of a unique system information file ID and a section name; the value contains the raw section data along with some metadata. The key is explained in more detail below.

Each sequence file may contain sections from many different ingested system information files, and the sections (and sub-sections) that are produced from a system information file may be distributed among a multitude of sequence files. Furthermore, each of the sequence files may be assigned to a different data node. In one example, stage 4 sends a group of sections and sub-sections to a data node and then sends a subsequent group of sections and sub-sections to a different data node, performing a round-robin process among the different data nodes when sending the groups of sections and sub-sections. An example size for a group may be one-hundred sections and sub-sections, though embodiments may vary. Also, in a scenario when a sequence file is larger than a threshold (e.g., more than an HDFS block), the file system may distribute the sequence file across multiple ones of the nodes.

As mentioned above, the scope of embodiments is not limited to HDFS, as any Map Reduce storage system may be used; nor is the scope of embodiments limited to sequence files. However, for HDFS embodiments, sequence files may provide several advantages. HDFS is optimized for maintaining files with large block sizes (in order of 100 MB), and sequence files can be made as large as desired. By using sequence file format, various embodiments achieve sectioning of the system information, which benefits downstream systems by allowing for efficient processing and analytics, while at the same time not creating files that are smaller than a recommended size for HDFS.

Various embodiments also include metadata in each section or sub-section that is used for both data retrieval and analysis. Such metadata may include: a sequence identifier that identifies a given section or sub-section from a system information file and helps downstream processes to combine and verify that all parts corresponding to a system information file have been collected; offset within a sequence file and a name of the sequence file, which is also stored later in HBASE to help a user seek directly to raw section instead of scanning the entire sequence file; and security flags that can be placed in the data to filter unauthorized access.

Figure 5:
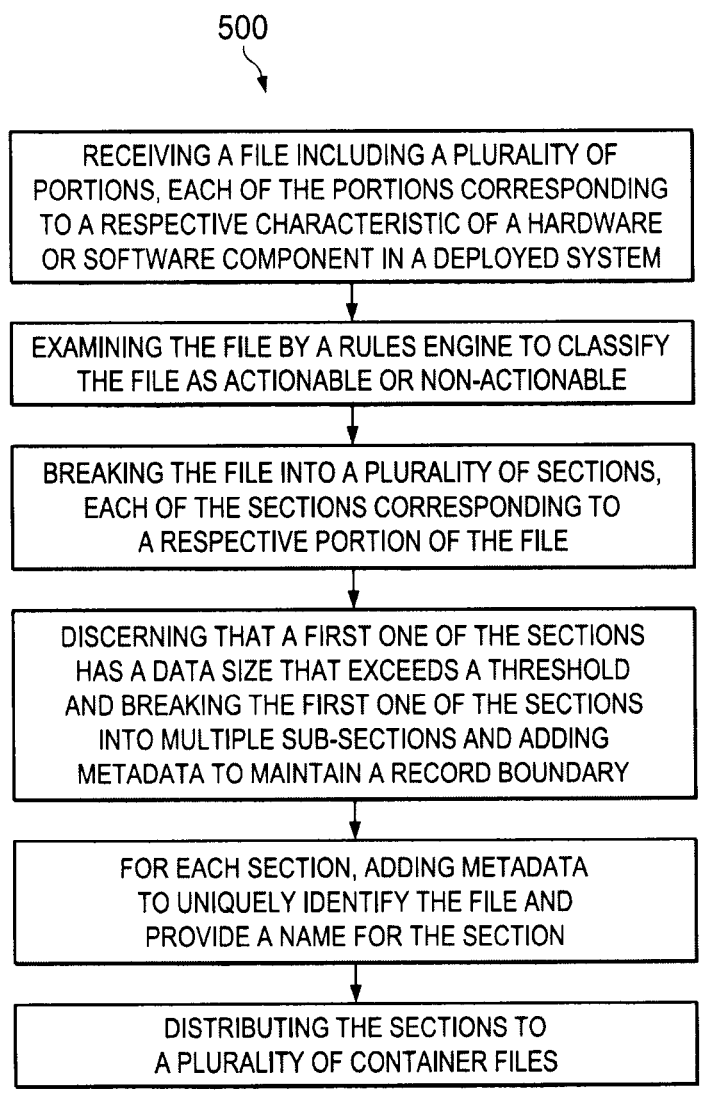
FIG. 5 is an illustration of an example process that may be performed by a data ingestion section, according to one embodiment.

FIG. 5 is an illustration of an example process 500 that may be performed by data ingestion section 110 in some embodiments. For example, one or more ingestion servers (such as servers 208a-c of FIG. 2) may execute computer code to perform the functions described below.

At action 510, the ingestion section receives a file that includes a plurality of portions, each of the portions corresponding to a respective characteristic of a hardware or software component in a deployed system. Continuing with the example above regarding a network storage cluster, a received file may have a portion directed to a physical configuration of a RAID, other portions directed to log information for each of the disks, etc. In this example, each of the portions includes configuration information or log information for some aspect of the deployed system.

In various embodiments the file may take any appropriate form. In one specific example, the file is formatted as a packet that is sent over a network, such as the Internet. The packet has a header that includes, among other things, information that identifies a reason that the file was sent. For instance, some files may be sent for the purpose of periodic reporting and may or may not include any information indicating an error in the deployed system. Other files may be sent due to the detection of an error at the deployed system.

In action 520, the flume examines the file using a rules engine to classify the file as actionable or non-actionable. Continuing with the example above, the rules engine examines the header to discern whether the file was sent as a periodic report or as an error indication. An error indication is generally considered an actionable event in this example, whereas a periodic report is generally considered a non-actionable event.

Action 520 may further include sending a message to a customer case generator in the event that the file is classified as actionable. In one example, an ingestion server sends a message (such as a Java Message Service, JSM, message) to a customer case generator. In response, the customer case generator generates a file or object in the support system to alert a technician or support program that there is a customer error to be addressed.

In action 530, the flume breaks the file into a plurality of sections, each of the sections corresponding to a respective portion of the file. Thus, while the file that is received may be quite large, the file may include a multitude of sections so that each section is only a fraction of the original file size. Furthermore, each of the portions in the file is directed to a specific characteristic of a hardware or software component, so that breaking the file up into section captures a logical division of the original file.

In action 540, the ingestion section discerns that one of the sections has a data size that exceeds a threshold. For instance, when a flume agent streams a new section from its source it fills that information in a fixed size memory buffer. If the buffer get filled to its maximum capacity before reading the section completely, the agent reads backwards in the buffer from the end until it finds the last logical boundary of the record. In other words, the threshold may change with each section to be commensurate with the remaining space in the memory buffer.

Action 540 continues with the flume breaking the section into multiple sub-sections and adding metadata to maintain the relationships among the subsections. In this example, once the flume agent finds the boundary, the buffer is reset to that boundary, and the flume creates a new sub-section with metadata. As described above, the metadata may include partial section flags, counters, last section flags, and/or the like as appropriate. The remainder of the buffer (from the last logical boundary) is copied to the next input buffer and the process continues until the input section is read completely.

At action 550, the flume adds metadata to each of the sections and sub-sections to uniquely identify the system information file and provide a name for each section. For example, one way to identify the file is to combine a time stamp (e.g., a time the system information file was generated or received) with an identifier of the system that sent the file. Any appropriate technique to uniquely identify a file can be used. Section names may be provided in any manner that uniquely names a section. For instance, if three portions of the original system information file each provide configuration information for a different drive in a RAID, then the corresponding sections might be named "diskconfig0", "diskconfig1", and "diskconfig2." In some instances, each portion of the file begins with a brief identifier, and that brief identifier may be used to generate a name for a section.

At action 560, the flume distributes the sections to a plurality of container files. In one example, there are twenty sections and sub-sections generated from a file and five data nodes each having one container file. The flume saves a first section to a first container file, then saves the next section to the next container file, repeating for the different container files and sections/sub-sections so as to distribute the sections to the different data nodes. Each container file may include sections from a variety of different system information files from a variety of different deployed systems. Such distribution of sections facilitates the Map Reduce processing by spreading data among the data nodes and allowing each of the data nodes to take part in distributed processing of the data.

In an example in which the container file is a sequence file, each section is stored as a key value pair. For each section, the key includes the system information file ID and section name; the value includes the raw data from the section.

Process 500 of FIG. 5 is exemplary, and the scope of embodiments is not limited to the specific configuration shown. Other embodiments may add, omit, rearrange, or modify one or more actions. For instance, process 500 may be performed each time a new file is received at the front end. Furthermore, other embodiments may add a feedback loop and throttle feature before the flume so as to slow the transmission of new files into the flume when flume memory and processing resources are near a maximum use.

Returning to FIG. 1, data processing section 130 includes processes that access the data in the sequence files and perform Map Reduce jobs to transform the raw data into more useable data. Data processing section 130 includes log processor function 132 and configuration data "config" loader function 134. Config loader 134 includes a module in the data processing pipeline responsible for loading configuration data from the sequence files into a distributed database, such as HBASE. Architecture 100 uses the configuration data to enable users to get a view of a particular system's cluster configuration at a time of an event. It also enables the user and support engineer to track changes made to system configuration and status over a period of time.

Config loader 134 itself is divided into two stages—a parser stage and a loader stage. In one example, the data in the sequence files is in the form of logs and command outputs, and the parsers parse the data using regular expression patterns to extract meaningful configuration information. Output of parsing is a well-structured form like JSON or XML.

In this example, parsing code is specific to a section being parsed, as each section is parsed using its own regular expression pattern. Parsing is executed as a map task (in Map Reduce programming) where the input is the raw data sequence file mentioned above.

In general, map jobs are dependent on the size of data so that the larger the number of blocks being written, the larger the number of jobs that are invoked. Architecture 100 can scale parsing resources based on the load. In an example system on weekends, when traffic is high with periodic updates, the system may invoke more concurrent parser jobs. By contrast, weekday traffic may be less so that the system shifts processing resources to analytic workloads rather than parsing.

In one embodiment, parsers are written in perl due to complex regular expression patterns which are written over several years to address variations in un-structured data. However, other languages are possible for the parser, as the sequence file format and HDFS streaming utility allow for a parsing stage which can support any language which can read from a standard input and write to a standard output (including shell scripts). It is also possible to allow external teams to write parsers on the data in a given language of choice for the sections and run those parsers as Map Reduce on a cluster.

The next stage of config loader 134 is the loader stage. Once the raw sections are parsed (in the map step), the loader stage conforms the sections to a configuration object model and loads the parsed and conformed sections into HBASE in a reduce step. The loader stage uses data from several sections to build a desired data model. An example of a desired data model is a model of a system that is deployed as a cluster. Each of the different systems that make up a cluster (e.g., drives, RAIDS, controllers, etc.) may have its own sections in the sequence files, though there may be no section for the cluster itself. The loader stage uses a configuration model that represents a cluster to identify the sequence file sections that belong to a given cluster, thereby generating cluster information that may be quite meaningful to an end user.

The load step then appends cluster data to the parsed sections, as explained in the HBASE discussion below. In this example, a single Map Reduce job runs the processing pipeline end to end and scales by invoking parsers depending on amount of data received.

Continuing with data processing section 130, log loader function 132 processes and loads log and performance data from the sequence files. Similar to config loader 134 the log loader 132 is responsible for processing log and performance data which is generally large in volume. This data is stored into a data warehousing technology, such as HIVE. HIVE allows for analyzing large volumes of data using Map Reduce operations, by writing simple SQL-like queries. The log loader 132 supports multiple log formats with the following standard stages of transformation.

Read stage: The read stage reads a log file record by record using configurable record boundaries. Reader may be configured to read xml, line, or a regular expression-based record boundary pattern for complex log structures. The read stage also joins sub-sections into sections (where sub-sections are described above in the ingestion discussion).

Parse stage: The parsing stage processes each record and brings it to a standard format. After the parse stage, each log has some common set of fields like date, sequence/offsets, severity, message, etc.

Tag stage: The tag stage tags the log file with the help of configuration information available in HBASE. The tag stage extracts important signatures (like known patterns and configuration information) out of a log line and store it as key value pairs. This information may be used later to combine a log with its corresponding configuration information. For example if there is a disk failure a user might want to know which shelf bay or RAID that disk belongs to, and the tag stage tags the log of the failure with the configuration information to allow such data association.

Write stage: The write stage writes parsed and tagged data to HIVE.

Fork stage: In the fork stage, some of the information is filtered, aggregated and stored in HBASE which allows low latency random lookups to get a summary view. One use case includes loading metadata information about each log file, such as start date, end date, offset, which is then used by a log data viewer function as described below with respect to the data access interface section 150.

Moving to the processed data storage section 140, it was described above that the processes 132, 134 load data to HIVE and HBASE. Section 140 includes HIVE and HBASE, which are described more fully below. It should be noted, though, that the scope of embodiments is not limited to HIVE and HBASE, as other technologies may be used where appropriate.

HBASE is a non-relational, distributed database available from Apache Software Foundation. HBASE runs on top of HDFS. In embodiments which use a file system other than HDFS, another non-relational distributed database may be used. The present example uses HBASE to store the parsed configuration information from config loader 134. Furthermore, in the present example the parsed configuration data is stored in such a way that lookup of clusters is simplified.

In HBASE, architecture data is stored in the following format: Row Key, Column (qualifier), Timestamp, Value. In some embodiments it may be desirable that the data generally expected to be requested in a single user request (e.g., information for an entire cluster rather than just a component of a cluster) is stored together. To facilitate such a feature, some embodiments select a row key that includes a unique ID which is combination of a cluster identifier, a generation date for the original file that was received in ingestion section 110 expressed in inverted epoch time, and a system id (such as the system name mentioned above). The cluster identifier may be generated by the loader stage of the config loader 134, where the cluster identifier uniquely identifies a cluster of system components. Since the cluster identifier is the first part of the row key, information belonging to the same cluster is stored adjacently in sorted order of time in HBASE. For non-clustered systems, the cluster identifier may be replaced with a unique system identifier to provide a view of a single system's configuration.

The generation of the key enables users to view a cluster snapshot at any point in time irrespective of the fact that the snapshot is created using data from different files sent by different component systems of the cluster at different times. Files may arrive at ingestion section 110 from a clustered system out of order and at different times. A data structure, such as the one described above using the row key, may allow a user to employ a single sequential seek instead of multiple random seeks at multiple different locations in storage.

The next entry in HBASE architecture is column (qualifier). Each hardware or software component (e.g., a device or motherboard) is assigned its own row, and a column in a given row includes the parsed configuration data for that hardware or software component. A single object may have multiple instances in a system. For example: A RAID has multiple devices in it, and each of those devices may be included as an instance of the RAID. The column data may be expressed in a JSON-like format, where each instance is an entry in a Map with key as unique instance identifier.

In some embodiments, a binary serialization format called AVRO from Apache Software Foundation may be used to store the column value in an HBASE entry. AVRO provides a confined schema for each object, which was missing in JSON (which is more free form) and has significantly less memory footprint than XML or JSON. AVRO also supports schema evolution. A schema can be changed over time by, e.g., adding new fields. It also maintains backward compatibility to read data written using an old schema.

Furthermore, in addition to the parsed configuration data, some embodiments also store raw file pointers in HBASE. This enables user to lookup raw data, such as logs. The raw file pointers can be stored in a different column family because generally use cases which employ raw data are different from the use cases which employ processed data.

HBASE generally does not provide adequate support for secondary indexes. For example if a user is interested in finding data for a specific cluster or system the user can directly come to HBASE and search. But if the user is searching for all systems installed in a site or all systems belonging to a customer, HBASE may not be able to find the answer efficiently.

The data processing section 130 (mainly config loader 134) can be programmed to generate configuration information for sets different than clusters (e.g., sites). The config loader 134 can be programmed to generate such information and then post the information on which secondary indexes are based in a document format that is compatible with search platform 144. Search platform 144 then indexes these documents, where each document maintains a mapping with the row key in HBASE. An example search platform includes SOLR, which is a search platform available from Apache Software Foundation SOLR is generally more powerful than database indexes by providing features such as tokenized searches and context sensitive searches.

While the above example employs SOLR, it should be noted that other embodiments may use any appropriate search technology.

In the example of FIG. 1, data access workloads can be broadly categorized into two formats: data diagnostic workloads and data analytics/proactive support workloads. Data access interface section 150 supports both kinds of workloads.

Examples of data diagnostic workloads include scenarios where a support user is troubleshooting a customer problem and does a drill down into specific system's or cluster's data. The support user has a view of the cluster configuration and can analyze logs and performance data. The support user can analyze the state of the system at various intervals to find the root cause of a reported error. Such use cases generally benefit from a very low latency access (in sub seconds) to data.

Examples of data analytics/proactive support workloads include scenarios where data is analyzed in bulk either on a scheduled basis (planned workloads) or ad-hoc basis (unplanned workloads). Planned workloads are generally used for proactive support (such as analyzing bad configuration or risk upfront) and Key Performance Indicator (KPI) reports. Unplanned workloads may include any kind of data mining which is used to improve quality of deployed products and services, such as examining how systems are impacted by a specific issue. The Service Level Agreement (SLA) for these workloads is generally relaxed compared to data diagnostic workloads.

Architecture 100 includes interfaces and applications to address both kind of workloads. REST and Metamodel interface 154 generally handles data diagnostic workloads. HIVE queries 152, production batch jobs 142, and rule engine 156 generally handle data analytics/proactive support workloads.

Representational State Transfer (REST) is web service design model and is one example of an interface that can be exposed to end tools to allow those ends tools to access stored data. The scope of embodiments may include any appropriate interface, whether for web services or otherwise.

In this example, RESTful services are exposed for end tools to view both raw and processed data in low latency response times. The use cases are broadly classified as search, basic APIs for raw data access, and Object APIs.

Search: Generally used for summary reports (e.g., dashboards) and identified systems for further drill down. These use cases are mainly implemented over search platform 144 and HBASE backend.

Basic APIs for raw data access: These APIs are used for listing, viewing and downloading raw data. They are built by using metadata stored in HBASE which points to the file locations in HDFS.

Object API: Used to view processed API data stored in HBASE.

Metamodel APIs are complementary to REST. The concept of metamodel is to abstract data from its relation (model). While the parsed configuration data is stored in flat format in HBASE, metamodel describes how the objects are related together. Metamodels are maintained in GraphML or other suitable format, a sample of which is shown in XML code below.

```
<graph id="meta-model" edgedefault="directed" >
<node id="cluster">
    <data key="nodeId">cluster</data>
    <data key="key.attributes">cluster_id</data>
</node>
<node id="system">
    <data key="nodeId">system</data>
    <data key="key.attributes">system_id</data>
</node>
..
.
<edge id="e16" source="cluster" target="system" />
<edge id="e17" source="cluster" target="vserver" />
..
.
</graph>
```

The XML above shows that CLUSTER and SYSTEM objects have a direct relationship where cluster is a parent and system is a child. The code also provides an attribute which ties the two object together (e.g., cluster_id and system_id).

Process 154 provides a single repository to maintain the metamodels of relevant deployed systems. Process 154 also provides a unified mechanism to retrieve the metamodel and request data against the metamodel across supportability related business functions. Providing the metamodel in data access interfaces 150 may save clients from having to maintain their own copies of the model in some embodiments.

Architecture 100 provides a two-phase mechanism where a client first requests the metamodel and then the client uses the metamodel to request stored data. This feature gives the client the ability to navigate the model and mark any objects that it desires to view. The client can then request any objects in a single web service request. Such feature may save several round trips that the client would have otherwise made over the network to get the desired data. Process 154 also maintains relational models among the various hardware and software features of any deployed system through directed graphs.

Any process that maintains or supports several versions of relational schemas may benefit from the use of the metamodel as shown in FIG. 1. The use of the metamodel decouples the client server interactions and makes applications more data driven rather than writing and maintaining code to handle such different versions on the client side. Thus, various embodiments are applicable to solve industry wide problems where different product lines or different versions of a product line are supported through a unified umbrella of tools.

REST (or another suitable end tool interface) may provide APIs for log performance and data viewing. Cluster support can pose the challenge that logs are distributed over several incoming files, and there is currently no easy way to view log activity for an entire cluster together to correlate the issues. As explained above, multiple systems may be included in a cluster, and files for each of the different systems may arrive to the frontend 112 out of order or not at the same time.

The present embodiment includes a log streaming API to provide an on-demand merge of log files across an entire cluster for a given date range. Such API can be included in an end tool interface, such as REST. In one example, a user provides a system/cluster identifier, name of the log files to consider, name of nodes within a cluster to consider, and a date range. The application then sorts the log meta-data (as described in unified log parsing section above) based on start time of each log, open and close the log files in that order and do a standard merge by moving record pointers.

On a large cluster such process may include reading several input streams together, and performance might be slow if the processes are performed sequentially. Some embodiments implement parallel I/O worker threads to improve speed.

In another embodiment, the data is stored in a temporary HBASE table (where it is automatically purged after a specified period) instead of being streamed back to the user. In such an embodiment, the data may be saved with the following key in HBASE:
Cluster>Object>Counter Name>Time Stamp (day granularity)>System Id>Instance Key>timestamp<epoch>
The user can then make separate REST calls to generate various performance views on this data.

Moving to production batch 142, such feature includes integration with the metamodel and rule engine 156. Production batch 142 includes Map Reduce functions that are explained below.

Data Model: Rules engine 156 writes rules on a data model. This data model is provided by a code generation module of process 154. Production batch 142 generates plain java objects by referring to the AVRO schemas, which can be ported to the rules authoring interface.

Rules authoring interface: This interface can be provided at rules engine 156, which may include a DROOLS engine or other rule engine. Rule engine 156 provides a GUI-based authoring interface that a user may employ to write rules involving one or more objects and save the rules to an output model. Such feature may enable even non-technical users to write business logic within architecture 100. Example of such rules include system-at-risk rules or storage efficiency rules.

Rules executable: Once the rules are written and approved they are ported as executable jar files which are packaged in a production batch application.

Production Batch Application: This is a wrapper application responsible for invoking rules in Map Reduce. The application invokes a Map Reduce task on source data in HBASE. Here the metamodel API is used to convert the AVRO data stored in HBASE into the rules-specific data model generated above. The output is collected and stored back into HBASE.

The same application can also execute functions defined by metamodel API. The metamodel API may include a mirrored architecture where business functions defined at the client side can be ported to the server side and executed as Map Reduce jobs.

REST: Rules output are exposed to end users and tools through the REST APIs described above.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors (not shown) running in one or more of master node 206, data nodes 205*a-c*, ingestion servers 208*a-c*, storage system 204, or computer 210 (FIG. 1) execute code to implement the actions described above or shown in FIG. 5.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method, comprising:

receiving a file comprising a header, the file including a plurality of portions, each of the portions corresponding to a respective characteristic of a hardware or software component in a deployed system;

classifying the file as actionable in response to examining the header and discerning therefrom that the file corresponds to an error on a deployed system;

classifying the file as non-actionable in response to examining the header and discerning therefrom that the file corresponds to a periodic report from a deployed system;

breaking the file into a plurality of sections, each of the sections corresponding to a respective portion of the file;

for each section, adding first metadata to uniquely identify the file and provide a name for the section; and distributing the sections to a plurality of container files.

2. The method of claim 1, the container files comprising sequence files.

3. The method of claim 1, the file comprising a packet sent over the Internet to a remote customer support site.

4. The method of claim 1, comprising:

examining the header by a rules engine to classify the file as actionable or non-actionable.

5. The method of claim 1, comprising:

sending a message to a customer case generator in response to classifying the file as actionable; and generating a customer case to investigate an error indicated by the file.

6. The method of claim 1, comprising:

discerning that a first one of the sections has a data size that exceeds a threshold; and breaking the first one of the sections into multiple sub-sections and adding second metadata to indicate a relationship among the sub-sections, the second metadata including a flag to indicate that a sub-section is less than a complete section and a sequential counter to indicate a sub-section number within the first one of the sections, each of the sub-sections including the first metadata; and distributing the sub-sections to the plurality of container files.

7. The method of claim 1, the first metadata to uniquely identify the file comprising an identification of the deployed system and a time that the file was generated.

8. The method of claim 1 in which each section is saved to its respective container file as a key value pair, wherein a key includes a unique identifier of the file and the name for the section, and wherein a value includes raw data content from the section.

9. A system comprising:

a storage system; and an ingestion server in communication with the storage system, the ingestion server executing code to:

receive a system information file comprising a header over a network from a remote, deployed system, the system information file including a plurality of portions, wherein each portion describes a respective characteristic of a hardware or software component of the deployed system;

classify the system information file as actionable in response to examining the header and discerning therefrom that the system information file corresponds to an error on a deployed system;

classify the system information file as non-actionable in response to examining the header and discerning therefrom that the system information file corresponds to a periodic report from a deployed system;

divide the system information file into a plurality of sections, each of the sections corresponding to a respective portion of the system information file;

within each section, add a unique identifier of the system information file and a name of the section;

store the plurality of sections to a plurality of container files in the storage system, each of the sections being added as a key value pair, wherein a key includes the unique identifier of the system information file and a name of a respective section.

10. The system of claim 9, comprising a value of a key value pair comprising raw data from the respective section.

11. The system of claim 9, the unique identifier of the system information file comprising an identification of the deployed system and a time that the system information file was generated.

12. The system of claim 9, comprising:
a distributed computing system in communication with the ingestion server and operable to perform Map Reduce operations on data in the container files.

13. The system of claim 9, the ingestion server to:
discern that a first one of the sections has a data size that exceeds a threshold;
break the first one of the sections into multiple sub-sections and adding metadata to indicate a relationship among the sub-sections, the metadata including a flag to indicate that a sub-section is less than a complete section and a sequential counter to indicate a sub-section number within the first one of the sections; and
distribute the sub-sections to the plurality of container files.

14. A computer readable medium tangibly recording computer program logic comprising a plurality of instructions, that when executed, cause a system to:
parse a file comprising a header into a plurality of sections, wherein the file includes multiple portions, wherein each of the portions comprises information directed to a respective characteristic of a deployed system, further wherein each of the sections corresponds to a respective portion;
classify the file as actionable in response to examining the header and discerning therefrom that the file corresponds to an error on the deployed system;
classify the file as non-actionable in response to examining the header and discerning therefrom that the file corresponds to a periodic report from the deployed system; and
distribute the sections among a plurality of container files in a distributed storage system by storing each section as a key value pair, each respective key including a unique identifier of the file and a name of a respective section.

15. The computer readable medium of claim 14, a value of a key value pair includes raw data from the respective section.

16. The computer readable medium of claim 14, the unique identifier of the file comprising an identification of the deployed system and a time that the file was generated.

17. The computer readable medium of claim 14, comprising the plurality of instructions, that when executed, cause the system to:
discern that a first one of the sections has a data size that exceeds a threshold;
break the first one of the sections into multiple sub-sections and adding metadata to indicate a relationship among the sub-sections, the metadata including a flag to indicate that a sub-section is less than a complete section and a sequential counter to indicate a sub-section number within the first one of the sections; and
distribute the sub-sections to the plurality of container files.

18. The computer readable medium of claim 14, comprising the plurality of instructions, that when executed, cause the system to:
examine the header by a rules engine to classify the file as actionable or non-actionable.

* * * * *